(12) United States Patent
Kalis et al.

(10) Patent No.: US 6,427,959 B1
(45) Date of Patent: Aug. 6, 2002

(54) MOUNTING BRACKET FOR AN ELECTRONIC DEVICE

(75) Inventors: Robert M. Kalis, Overland Park; David Lammers-Meis, Prairie Village, both of KS (US)

(73) Assignee: Garmin Corporation (TW)

( * ) Notice: Subject to any disclaimer, the term of this patent is extended or adjusted under 35 U.S.C. 154(b) by 0 days.

(21) Appl. No.: 09/723,166

(22) Filed: Nov. 27, 2000

(51) Int. Cl.$^7$ .............................. A47F 5/08; H04M 1/04
(52) U.S. Cl. .................... 248/288.11; 379/446
(58) Field of Search .................. 248/288.11, 286.1, 248/287.1, 292.12, 222.41, 225.11; 403/97, 59, 83, 104, 110; 379/446, 455, 435, 454

(56) References Cited

U.S. PATENT DOCUMENTS

| | | | | |
|---|---|---|---|---|
| 5,779,205 A | * | 7/1998 | Ching | 248/205.8 |
| 6,173,933 B1 | | 1/2000 | Whiteside et al. | 248/276.1 |
| 6,062,518 A | * | 5/2000 | Etue | 248/231.21 |

* cited by examiner

*Primary Examiner*—Korie Chan
*Assistant Examiner*—Ingrid Weinhold
(74) *Attorney, Agent, or Firm*—Devon A. Rolf

(57) ABSTRACT

The present invention comprises an apparatus for positioning an electronic device with respect to a surface. The apparatus includes a cradle adapted to be releasably secured to the electronic device having a front and back side. The apparatus also includes a support adapted to be mounted to a surface. The apparatus has a connector that has a first and second end. The first end of the connector is slidably connected to the cradle wherein the cradle is adapted to move along its longitudinal axis. A pin pivotally couples the second end of the connector to the support. A user can selectively adjust the longitudinal and pivotal position of the cradle by grasping a handle located on the end of the pin and moving the cradle to a desired position. A user can fix the position of the cradle by turning the handle located on the pin thereby engaging the locking mechanism located on the connector and support.

21 Claims, 3 Drawing Sheets

MOUNTING BRACKET FOR AN ELECTRONIC DEVICE

STATEMENT REGARDING FEDERALLY SPONSORED RESEARCH OR DEVELOPMENT

Not Applicable.

CROSS-REFERENCE TO RELATED APPLICATIONS

Not Applicable.

FIELD OF INVENTION

This invention relates to the field of a mounting apparatus for an electronic device. More specifically, a mounting apparatus for an electronic device located in a vehicle, which allows the electronic device to be selectively mounted in a number of positions and which can be raised, lowered, or tilted by the use of one handle.

BACKGROUND OF INVENTION

The use of electronic devices in vehicles has gained increasing popularity in the past decade. For example, cellular phones are being used in vehicles and elsewhere. It is routine to observe a person using a cellular phone while driving a vehicle. Cellular phones are either mobile or capable of being attached to the vehicle by some type of mounting apparatus. The mounting of the electronic device is advantageous in that it provides a stable support for the electronic device and eliminates the chance that it will be misplaced or lost within the vehicle.

The current state of the art in mounting portable devices within vehicles presents a number of limitations. First, it is very difficult to mount a portable device in a vehicle in a place where the display of the device can be easily seen and accessed by the user. Typically, electronic devices are mounted on the dashboard of vehicles. Because there are a substantial number of dashboard configurations that currently exist, as well as varying driver and passenger heights, it would be very difficult to create a non-adjustable or rigid mounting apparatus that would provide the necessary positioning for the electronic device to allow the user to see the display and access the device. Therefore, there is a need for a mounting apparatus that provides multipositional capabilities to adapt to different dash configurations, to allow the user to see the display, and allow easy access to the electronic device.

Secondly, the existence of numerous types of dashboard configurations creates a need for a mounting apparatus capable of adjusting to may different positions. Typically, there are many different knobs and pivot joints that need to be manipulated when changing the position of a mounting apparatus. In order to simplify the adjustment process, there is a need for a simplified mechanism for adjusting the mounting apparatus to a user selected position.

Accordingly, a mounting apparatus is needed that can be used to mount a portable electronic device within a vehicle that is capable of pivotal and translational adjustment that will enable the user to easily view and access the electronic device. Further, a mounting apparatus is needed that provides for a simplified mechanism that adjusts the position of the electronic device within a vehicle. The primary objective of this invention is to meet these needs.

SUMMARY OF THE INVENTION

The present invention comprises an apparatus for positioning an electronic device with respect to a surface. The apparatus includes a cradle adapted to be releasably secured to the electronic device having a front and back side. The apparatus also includes a support adapted to be mounted to a surface. The apparatus has a connector that has a first and second end. The first end of the connector is slidably connected to the cradle wherein the cradle is adapted to move along its longitudinal axis. A pin pivotally couples the second end of the connector to the support. A user can selectively adjust the longitudinal and pivotal position of the cradle by grasping a handle located on the end of the pin and moving the cradle to a desired position. A user can fix the position of the cradle by turning the handle located on the pin thereby engaging the locking mechanism located on the connector and support.

Additional objects of invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means and instrumentalities and combinations particularly pointed out in the appended claims.

BRIEF DESCRIPTION OF THE DRAWINGS

In the accompanying drawings which form a part of the specification and are to be read in conjunction therewith and in which like reference numerals are employed to indicate like parts in the various views.

DETAILED DESCRIPTION OF THE PREFERRED EMBODIMENT

Figure 1:
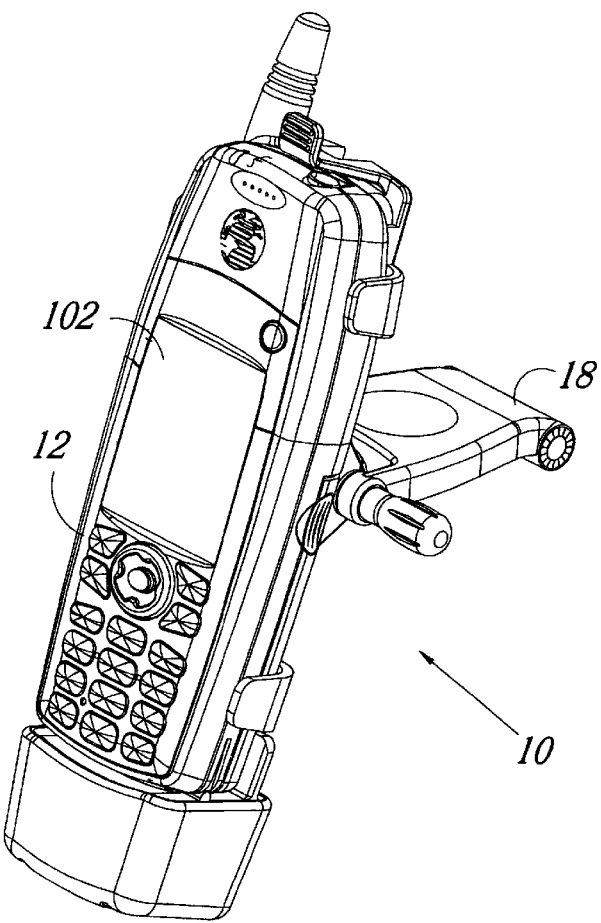
FIG. 1 is a perspective view of an electronic device coupled to the mounting apparatus according to the present invention.
Figure 2:
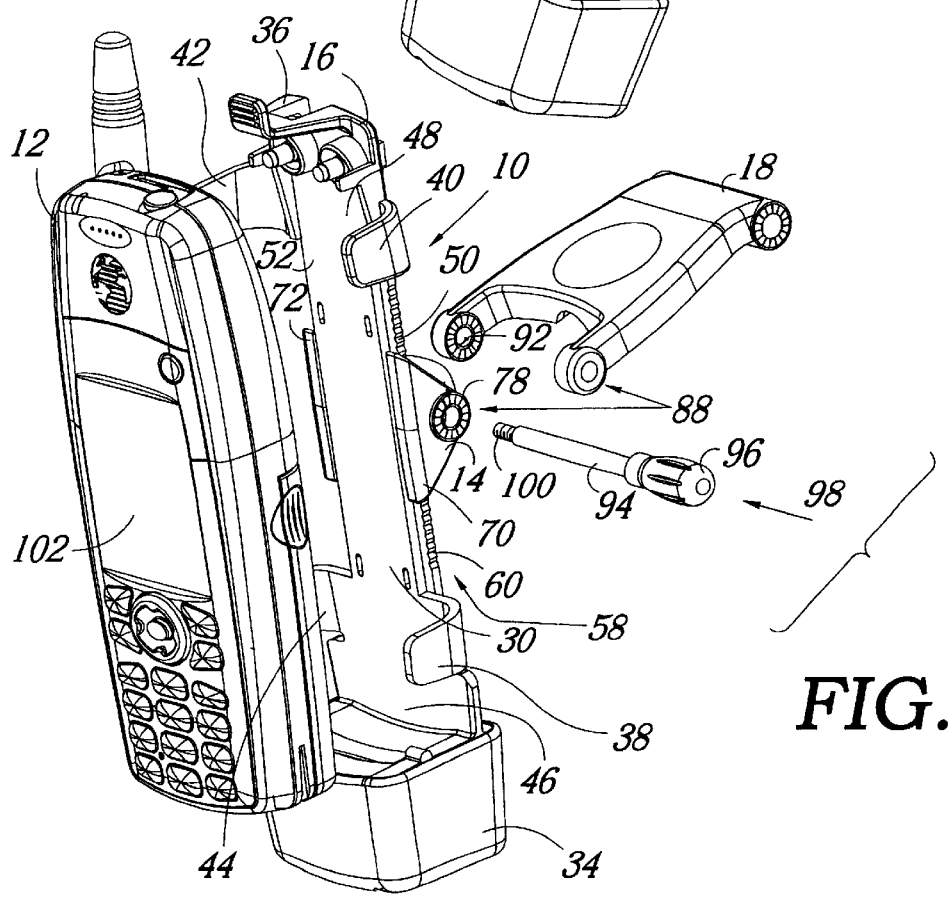
FIG. 2 is a front exploded view of the mounting apparatus as shown in FIG. 1.
Figure 3:
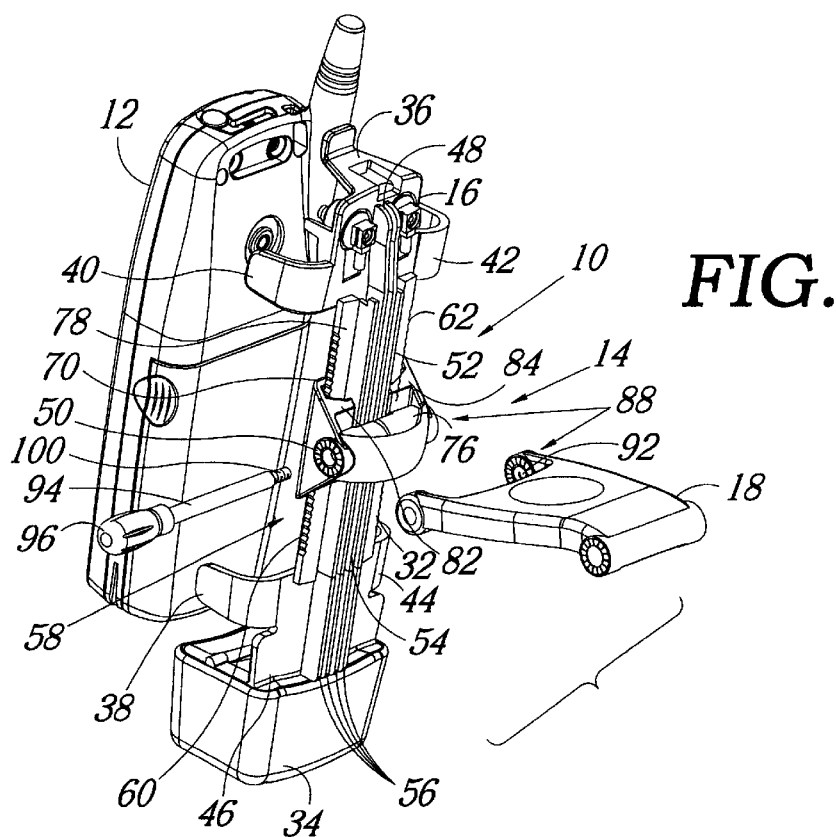
FIG. 3 is a rear exploded view as shown in FIG. 1.

Referring to the drawing in greater detail, and initially to FIGS. 1–3, a mounting apparatus embodying the principles of this invention is broadly designated in the drawings by reference numeral 10. Apparatus 10 is used to hold electronic device 12 on a surface, such as a vehicle dashboard. Electronic device 12 can be, for example, a cellular phone device, a personal digital assistant (PDA) or any other device that could be mounted to a cradle. Such a device typically includes a viewing screen 102, which generally conveys information to the user. Apparatus 10 includes a connector 14 slidably connected to cradle 16. As described below, connector 14 is pivotally coupled to support 18, which is mounted to a surface. Electronic device 12 is releasably coupled to cradle 16.

Cradle 16 is used to secure electronic device 12 on a surface in cooperation with connector 14 and support 18. As best seen in FIGS. 2 and 3, cradle 16 is rectangular shaped with front side 30 and back side 32. Base 34 is positioned on bottom end 46 and extends transversely from front side 30 of cradle 16. Top lock 36 is positioned at top end 48 and extends transversely from front side 30 of cradle 16. Side arms 38 and 40 are mounted on the right side 50 of cradle 16 and extend transversely from front side 30. Side arms 42 and 44 are mounted on the left side 52 of cradle 16 and extend transversely from front side 30. Base 34, top lock 36, and side arms 38, 40, 42, and 48 are used to removably mount electronic device 12 to cradle 16.

Tracking mechanism 58 is used to allow connector 14 and cradle 16 to move with respect to each other and to aid in retaining a fixed relationship between connector 14 and cradle 16 when engaged with each other. As best seen in FIG. 3, tracking mechanism 58 is made up of teeth 60 and 62 located along the right 50 and left 52 side of cradle 16. In addition, vertical spine member 54 protrudes transversely from back side 32 of cradle 16 and extends longitudinally from top end 48 to bottom end 46. Preferably, vertical spine member consists of four spine members 56 on back side 32 of cradle 16 and are parallel with each other.

Figure 4:
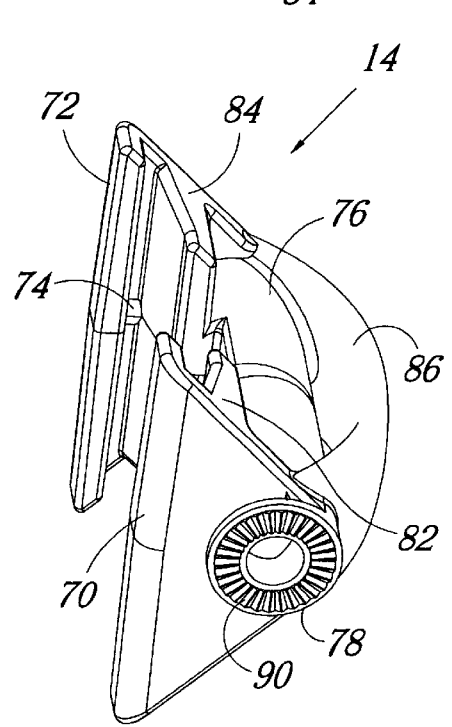
FIG. 4 is a front perspective view of the connector that couples the cradle to the support.
Figure 9:
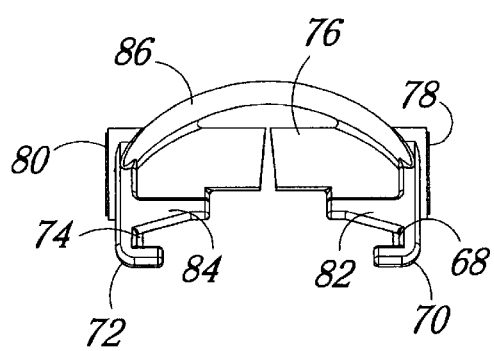
FIG. 9 is a top view of the connector shown in FIG. 4.
Figure 6:
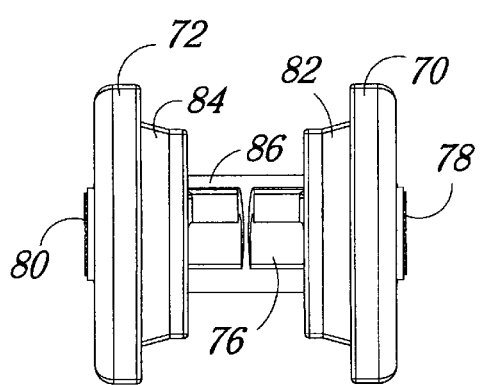
FIG. 6 is a front elevational view of the connector shown in FIG. 4.
Figure 7:
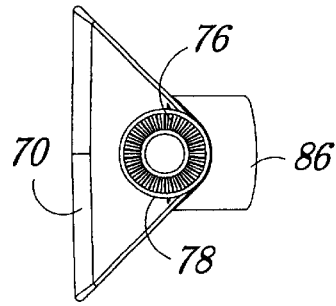
FIG. 7 is a right side elevational view of the connector shown in FIG. 4.
Figure 8:
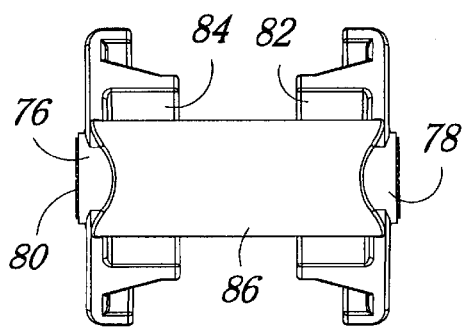
FIG. 8 is a rear elevational view of the connector shown in FIG. 4.

Connector 14 couples cradle 16 to support 18 for mounting apparatus 10 to a surface. Connector 14 is preferably made out of plastic or any other material with flexible characteristics. As best seen in FIGS. 5–9, connector 14 includes first side member 70 and second side member 72 that extend outwardly beyond front side 30 of cradle 16 and then toward each other. As seen in FIGS. 3, 4 and 9, first side member 70 has a tooth 68 and second side member 72 has a tooth 74 that are adapted to mate with teeth 60 and 62 located on cradle 16. It is preferable to include only one tooth on each of the first and second side members 70, 72, but it is understood that more than one tooth or any other type of mechanism that is consistent with this embodiment could be used to mate with teeth 60 and 62 located on cradle 16.

Connector 14 further includes split channel 76 that extends in a direction transverse the longitudinal axis of cradle 16 and along the back side 32 of cradle 16. First side member 70 is rigidly connected to right end 78 of split channel 76, and second side Meier 72 is rigidly connected to left end 80 of split channel 76. First bracing member 82 extends from first side member 70 in a direction transverse the longitudinal axis of cradle 16 and along the back side 32 of cradle 16. Second bring member 84 extends from second side member 72 in a direction transverse the longitudinal axis of cradle 16 and along the back side 32 of cradle 16. First bracing member 82 and second bracing member 84 extend toward each other along the back side 32 of cradle 16 but do not meet. First side member 70 and second side member 72 coupled with first bracing member 82 and second bracing member 84 form a slot in which cradle 16 is slidably mounted and permitted to move longitudinally along the axis of cradle 16. The present invention is not limited to connector 14 attaching to left side 52 and right side 50 of cradle 16 to permit translational movement along the longitudinal axis of cradle 16. It is within the scope of this invention for connector 14 to be slidably coupled at any location on the cradle that still allows similar translationl movement Connector 14 further includes arching member 86 that flexibly maintains the positioning of split channel 76, first and second bracing member 82, 84, and first 70 and second 72 side members. As best seen in FIG. 9, arching member 86 couples right end 78 and left end 80 of split channel 76. Arching member 86 is in a convex shape when viewed from the rear elevation view provided in FIG. 8.

Figure 5:
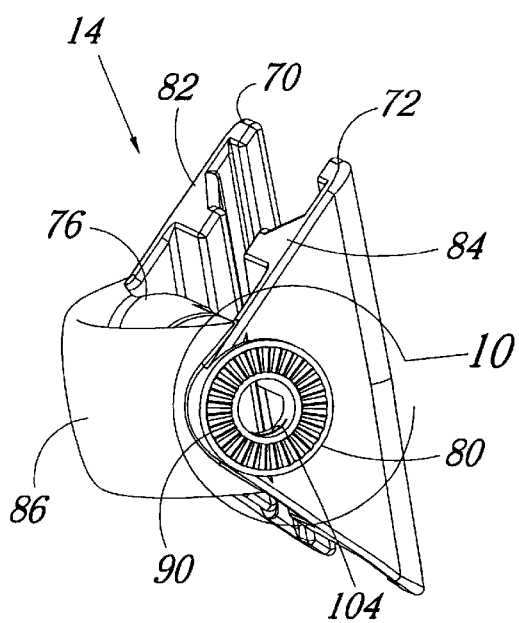
FIG. 5 is a rear perspective view of the connector shown in FIG. 4.
Figure 10:
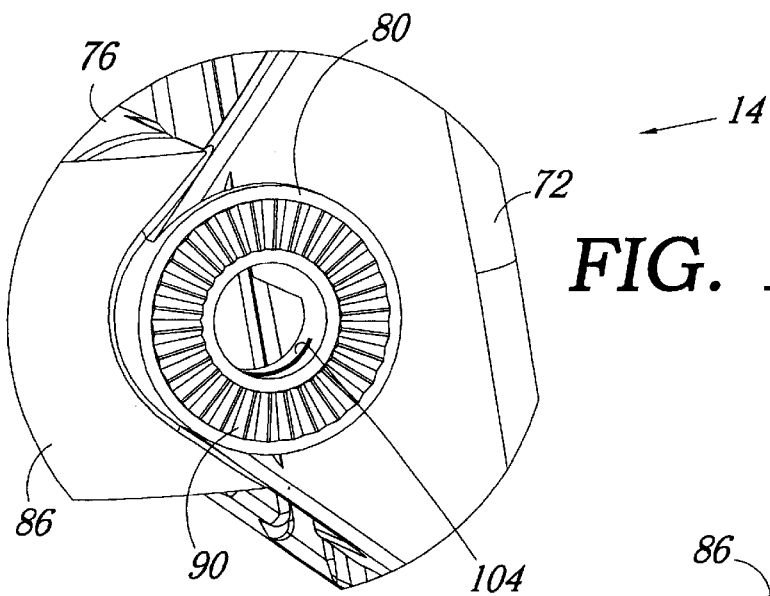
FIG. 10 is an enlarged detail view of the locking mechanism on the connector shown in FIG. 5.

Connector 14 and support 18 include a locking mechanism generally indicated by numeral 88 in FIGS. 2 and 3. As seen in FIGS. 4, 5, and 10, detents 90 are located on the right end 78 and left end 80 of split channel 76 and extend radially from the longitudinal axis of split channel 76. Matching detents 92 are located on support 18 and are adapted to mate with detents 90 on the right end 78 and left end 80 of split channel 76.

Locking mechanism 88 further includes a pin 94 pivotally and releasably coupling connector 14 to support 18. As seen in FIGS. 2 and 3, handle 96 is mounted on pin 94 so a user can selectively engage locking mechanism 88. Threads 100 are positioned on pin 94 and on the opposite end of handle 96. With reference to FIGS. 5 and 10, threads 104 are located on the inside of left end 80 of split channel 76 and are adapted to mate with threads 100 located on pin 94. When pin 94 is inserted into split channel 76 and a user turns handle 96, threads 100 and 104 engage and pin 94 is removably fastened inside split channel 76. In other words, pin 94 and threads 100 act as a screw type mechanism and threads 104 located on the left end 80 of split channel 76 act a nut that accepts threads 100. It should be understood that any other means for removably fastening pin 94 to left end 80 of split channel 76 is within the scope of the present invention.

In operation, support 18 is mounted to a surface. It is understood that support 18 could be mounted on any surface, but most preferably to a dashboard or console located in a vehicle. Connector 14 is pivotally coupled to support 18 by pin 94. As seen in FIGS. 1 and 2, support 18 is coupled with right 78 and left 80 ends of split channel 76 to allow pin 94 to slide through split channel 76 in direction 98. Further, connector 14 is slidably coupled to cradle 16. Electronic device 12 is then removably mounted to cradle 16 as seen in FIG. 1.

A user can adjust cradle 16 to a user selected position and then rigidly mount cradle 16 to remain in a fixed position. A user can rigidly mount cradle 16 to a fixed position by engaging locking mechanism 88. To engage locking mechanism 88, the user grasps pin 94 by handle 96 and inserts pin 94 through the right end 78 of split channel 76. Pin 94 is then rotated by using handle 96, thereby engaging threads 100 with the matching threads 104 located at the left end 80 of split channel 76. As the user rotates handle 96 to engage pin 94 with the left end of split channel 76, connector 14 begins to flex inward and the split in channel 76 and the distance between first 70 and second 72 side members move closer together. This causes detents 90 on cradle 16 and detents 92 on the connector 14 to engage and prevent pivotal movement about the axis of pin 94. In addition, the tightening of pin 94 causes teeth 60 and 62 to engage with matching teeth 68 and 74 located on first 70 and second 72 side members. When teeth 60, 62, 68, and 74 are engaged, cradle 16 is not permitted to move along the longitudinal axis of cradle 16. In addition, when a user selectively engages pin 94 with left end 80 of split channel 76, first bracing member 82 and second bracing member 84 move closer together and squeeze the vertical spine member 54 and further prevents cradle 16 from moving along its longitudinal axis. Therefore, pin 94 can be selectively adjusted so that cradle 16 is not permitted to slide along the longitudinal axis of cradle 16 or pivot about the axis of pin 96, thus remain in a fixed position with respect to a surface.

A user can selectively adjust cradle 16 to a user selected position by disengaging locking mechanism 88. To disengage locking mechanism 88, the user grasps pin 94 by handle 96 and then rotate pin 94, thereby disengaging threads 100 from the matching threads 104 located at the left end 80 of split channel 76. As the user rotates handle 96 to disengage threads 100, connector 14 begins to flex outward and the split in channel 76, including the distance between first 70 and second 72 side members, move apart. This causes detents 90 on cradle 16 and detents 92 on the connector 14 to disengage and allow pivotal movement about the axis of pin 94. In addition, the loosening of pin 94 causes teeth 60 and 62 to disengage from matching teeth 68 and 74 located on first 70 and second 72 side members. In addition, first bracing member 82 and second bracing member 84 no longer squeeze vertical spine member 54. Cradle 16 is then permitted to move along the longitudinal axis of cradle 16. Therefore, a user can selectively adjust the translational and pivotal position of cradle 16 with respect to a surface by the use of handle 96.

Constructed and operated as described, the invention provides an improved mounting apparatus 10 that is capable of pivotal rotation about the axis of pin 94 and translational movement along the longitudinal axis of cradle 16. Further, the rotational and translational capabilities of mounting apparatus 10 allow a user to selectively adjust mounting apparatus to a position in which the user can easily view and access electronic device 12. Additionally, mounting apparatus 10 can be mounted on to a multitude of dashboard configurations due to its multidirectional adjustment capacity. Still further, a user can adjust the pivotal and translational position of mounting apparatus 10 by the use of handle 96.

From the foregoing, it will be seen that this invention is one well-adapted to attain the ends and objects hereinabove set forth together with other advantages which are obvious and inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in accompanying drawings is to be interpreted as illustrative and not in a limiting sense.

What is claimed is:

1. An apparatus is provided for positioning an electronic device with respect to a surface, said apparatus comprising:
    a cradle for holding the electronic device, said cradle having a front side and back side;
    a support adapted to be mounted to said surface;
    a connector having a first end and second end, wherein said first end of said connector is slidably coupled with said cradle, and said second end of said connector is coupled to said support;
    a second end of said connector is pivotally connected to said support;
    said connector pivoted and releasably secured to a desired location;
    said connector further comprising a pin removably and adjustably coupling said support to said connector wherein said pin is adapted to allow said connector and said cradle to rotate about the axis of said pin; and
    a locking mechanism adapted to selectively prevent said cradle and said connector from sliding relative to each other, and prevent said connector from pivoting about the axis of said pin.

2. The apparatus as recited in claim 1, wherein said first end of said connector is slidably coupled to said cradle by a tracking mechanism located on said cradle and said connector.

3. The apparatus as recited in claim 2, wherein said tracking mechanism includes a plurality of teeth located along longitudinal peripheral edges of said cradle, and said connector having a structure for mating with the said plurality of teeth located on said cradle.

4. The apparatus as recited in claim 1, wherein said locking mechanism comprises a plurality of detents on said connector and a set of matching detents on said support.

5. The apparatus as recited in claim 4, wherein said pin includes threads, wherein said threads urge the engagement of said detents on said connector and said detents on said support.

6. The apparatus as recited in claim 5, further comprising a handle coupled to said pin, wherein a user can use said handle to selectively engage said locking mechanism.

7. The apparatus as recited in claim 1, wherein said first end of said connector comprises first and second side members that extend outwardly beyond the front side of said cradle and then toward each other in a direction transverse the longitudinal axis of said cradle with at least one tooth on each of a pair of peripheral ends of said side members to slidably couple with said cradle.

8. An apparatus for positioning an electronic device with respect to a surface, said apparatus comprising:
    a cradle adapted to be releasably secured to the electronic device, said cradle having a front side and back side;
    said support adapted to be mounted to a surface;
    a connector made of flexible material having a first end and second end, wherein said first end of said connector is slidably coupled with said cradle by a tracking mechanism located on said cradle and said connector, wherein said tracking mechanism includes a plurality of teeth located along longitudinal peripheral edges of said cradle, and said connector having a structure for mating with said teeth located on said cradle, and said second end of said connector is pivotally coupled to said support, wherein said connector can be pivoted and releasably secured to a desired location, wherein said first end of said connector comprises first and second side members that extend outwardly beyond the front side of said cradle and then toward each other in a direction transverse the longitudinal axis of said cradle wherein at least one tooth on each of a pair of peripheral ends of said side members slidably couples with said cradle, wherein said second end of said connector includes a split channel that extends in a direction transverse the longitudinal axis of said cradle and includes detents around the radial ends of said split channel, wherein said first and second side members are coupled to each end of said split channel, opposite said radial ends wherein said connector includes first and second bracing members that extend from said first and second side members, in a direction transverse the longitudinal axis of said cradle, and along the back side of said cradle so that said first and second bracing members and said first and second side members allow said cradle to slide along the longitudinal axis of said cradle, wherein said connector includes an arching member that flexibly maintains the positioning of said split channel, said first and second bracing members, and said first and second side members;
    a pin removably and adjustably coupling said support to said connector wherein said pin is adapted to allow said connector and said cradle to rotate about the axis of said pin, and wherein said pin includes threads;
    a locking mechanism including a plurality of detents on said connector and a set of matching detents on said support, wherein said threads urge the engagement of said detents on said connector and said detents on said support, and said locking mechanism adapted to selectively prevent said cradle and said connector from sliding relative to each other and prevent said connector from pivoting about the axis of said pin;

a handle coupled to said pin, wherein a user grasps said handle to selectively engage said locking mechanism;

wherein said support includes a first and second set of attaching members that can be placed outside each of said radial ends of said channel and having matching detents that can be selectively engaged with the detents located on both of said radial ends of said channel;

wherein said pin is inserted through said first attaching member of said support, through sad split channel, and through said second attaching member of said support allowing said connector to rotate about the axis of said pin;

wherein said pin can selectively maintain a secure position by fastening said pin in a position which urges said detents on said split channel and said detents on said first and second attaching members on said connector, thereby preventing pivotal rotation about the axis of said pin, and moving said bracing member and said side members closer together preventing said connector and said cradle from moving relative to each other; and wherein said pin can selectively release a secure connection, between said connector, said support, and said cradle thereby permitting said connector to pivot about the axis of said pin and permitting said cradle and said connector to move relative to each other.

9. An apparatus is provided for positioning an electronic device with respect to a surface, said apparatus comprising:

a cradle for holding the electronic device, said cradle having a front side and back side;

said support adapted to be mounted to a surface;

a connector having a first end and second end, wherein said first end of said connector is slidably coupled with said cradle, and said second end of said connector is coupled to said support;

said connector is made of a flexible material;

wherein said first end of said connector comprises first and second side members that extend outwardly beyond the front side of said cradle and then toward each other in a direction transverse the longitudinal axis of said cradle with at least one tooth on each of a pair of peripheral ends of said side members to slidably couple with said cradle;

wherein said second end of said connector includes a split channel that extends in a direction transverse the longitudinal axis of said cradle;

wherein said split channel includes detents around radial ends of said split channel; and wherein said first and second side members are coupled to each end of said split channel opposite said radial ends.

10. The apparatus as recited in claim 9, wherein said connector includes first and second bracing members that extend from said first and second side members, in a direction transverse the longitudinal axis of said cradle, and along the back side of said cradle so that said first and second bracing members and said first and second side members allow said cradle to slide along longitudinal axis of said cradle.

11. The apparatus as recited in claim 10, wherein said connector includes an arching member that flexibly maintains the positioning of said split channel, said first and second bracing members, and said first and second side members.

12. The apparatus as recited in claim 11, wherein said support includes first and second attaching members that can be placed outside each end of said channel and having matching detents that can be selectively engaged with the detents located on both ends of said channel.

13. The apparatus as recited in claim 12, further comprising a pin adapted to selectively engage said second end of said connector with said support, whereby said pin is inserted through said first attaching member of said support, through said split channel, and through said second attaching member of said support allowing said connector to rotate about the axis of said pin.

14. The apparatus as recited in claim 13, wherein said pin can selectively maintain a secure position by fastening said pin in a position that engages matching detents on said split channel and detents on said first and second attaching members on said connector, thereby preventing pivotal rotation about the axis of said pin, and moving said bracing members and said side members closer together preventing said connector and said cradle from moving relative to each other.

15. The apparatus as recited in claim 14, wherein said pin can selectively release a secure connection, between said connector, said support, and said cradle thereby permitting said connector to pivot about the axis of said pin and permitting said cradle and said connector to move relative to each other.

16. The apparatus as recited in claim 15, wherein said connector includes first and second bracing members that extend from said first and second side members, in a direction transverse the longitudinal axis of said cradle, and along the back side of said cradle so that said first and second bracing members and said first and second side members allow said cradle to slide along longitudinal axis of said cradle.

17. The apparatus as recited in claim 16, wherein said connector includes an arching member that flexibly maintains the positioning of said split channel, said first and second bracing members, and said first and second side members.

18. The apparatus as recited in claim 17, wherein said support includes first and second attaching members that can be placed outside each of said radial ends of said channel and having matching detents that can be selectively engaged with the detents located on both of said radial ends of said channel.

19. The apparatus as recited in claim 18, further comprising a pin adapted to selectively engage said second end of said connector with said support, whereby said pin is inserted through said first attaching member of said support, through said split channel, and through said second attaching member of said support allowing said connector to rotate about the axis of said pin.

20. The apparatus as recited in claim 19, wherein said pin can selectively maintain a secure position by fastening said pin in a position which urges said matching detents on said split channel and said detents on said first and second attaching members on said connector into engagement, thereby preventing pivotal rotation about the axis of said pin, and moving said bracing members and said side members closer together preventing said connector and said cradle from moving relative to each other.

21. The apparatus as recited in claim 20, wherein said pin can selectively release a secure connection, between said connector, said support, and said cradle thereby permitting said connector to pivot about the axis of said pin and permitting said cradle and said connector to move relative to each other.

* * * * *